C. P. Walter.
Cornice Mold.
N° 58,701. Patented Oct. 9, 1866.
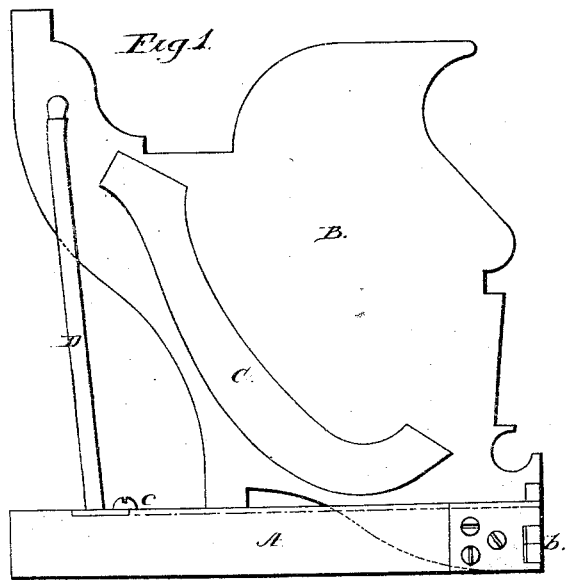
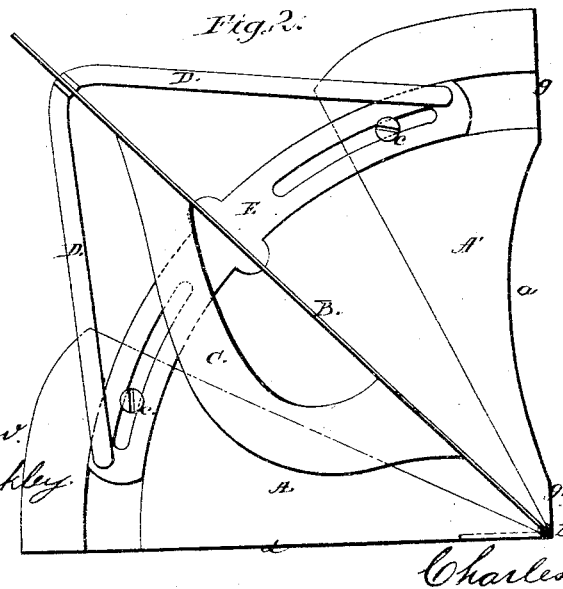
Witnesses.
J. E. Shaw
George E. Buckley
Inventor.
Charles P. Walter

UNITED STATES PATENT OFFICE.

CHARLES P. WALTER, OF ASTON TOWNSHIP, DELAWARE COUNTY, PA.

IMPROVED PLASTERING-MOLD FOR CORNICES.

Specification forming part of Letters Patent No. 58,701, dated October 9, 1866.

*To all whom it may concern:*

Be it known that I, CHARLES P. WALTER, of Aston township, Delaware county, Pennsylvania, have invented a new and useful Mold for Forming Plaster Cornices; and I do hereby declare that the following is a full, clear, and exact description of the construction and operation of the same, reference being had to the annexed drawings, and to the letters of reference marked thereon, in which drawings—

Figure 1 is a side elevation, and Fig. 2 a plan, of my improved mold.

My invention consists of a mold so constructed that with it stucco or other plaster cornices can be completely formed in the angles of a wall—an operation that has been hitherto performed tediously by hand.

To enable others skilled in the art to make and use my invention, I will proceed to describe its construction and mode of operation.

In the drawings, A A' represent the guides, the guide A' being beveled out, as at $a$, Fig. 2. B represents the "former," the outline of the front or forming edge of which is made the reverse of the cornice desired to be formed. I make the former preferably of steel, although it may be made of iron, cast or wrought, or of other metal, or of wood. The guides A A' and the former B are joined together, as shown, by a triple hinge-joint, at $b$, in such a manner that the front edge of the former shall extend with the angle of the wall in which the cornice is to be formed, the former having been set, as presently described, so as to divide the angle of the wall into two equal parts.

The former B is provided with a handle, C, and with stays D, and has attached to it a slotted plate, E.

The guides A A' may be separated, as shown in Fig. 2, more or less, as may be required to adapt the mold to any angle. Two thumb-screws, $c$, serve to secure the guides A A' in any position in which they are set.

My improved mold is operated in the ordinary manner. A strip having been temporarily tacked to the wall below the line where the cornice is intended to be formed, the mold is moved along on the upper edge of this strip, the plane face $d$ of the guide A being in contact with the wall. Then, when the front edge of the former B reaches the angle of the wall, the mold is moved along the upper edge of another strip similarly placed on the next side of the wall, the face $g$ of the guide A' being now in contact with the wall.

The object of the bevel $a$ is to facilitate the escape of the superfluous plaster shaved off by the operation of the mold, and thus prevent it from collecting in front of the mold in the angle of the wall.

My improved mold can be used for forming cornices in rooms of any shape, requiring no alteration to adapt it to the different shapes, except, through the slotted plate E, to expand or draw together the two guides A A' until they fit the angle of the wall in which the cornice is to be formed.

Having thus described my invention, what I claim, and desire to secure by Letters Patent, is—

1. The combination of the former B with the guides A A', in the manner and for the purpose substantially as shown and described.

2. The slotted plate E and screws $c$, or their equivalents, in combination with the former B and the guides A A', whereby the mold is made adjustable to angles of any degree, substantially as described.

CHARLES P. WALTER.

Witnesses:
J. E. SHAW,
GEO. E. BUCKLEY.